Jan. 30, 1973  J. H. SHARP  3,713,861
INHIBITOR DEVICE
Filed Dec. 4, 1969

INVENTOR.
JAMES H. SHARP
BY
Lawrence A. Wright
ATTORNEY

United States Patent Office 3,713,861
Patented Jan. 30, 1973

3,713,861
INHIBITOR DEVICE
James H. Sharp, Webster, N.Y., assignor to Xerox
Corporation, Rochester, N.Y.
Filed Dec. 4, 1969, Ser. No. 882,186
Int. Cl. B44d 15/00; C09k 1/00
U.S. Cl. 117—15                                16 Claims

ABSTRACT OF THE DISCLOSURE

A method of rendering a document copy-proof by overcoating the document with a film of a selected fluorescent material so that light emanating from an exposure source onto the document fluoresces in the image areas of the document as well as in the background areas. As a result, no image impression is made on the photosensitive element of the copying device.

This invention relates to a method of rendering a document or support member bearing an image or pattern thereon non-reproducible. More particularly, the invention relates to a method of overcoating a document with a highly fluorescent material in order to render it non-reproducible.

BACKGROUND OF THE INVENTION

For some time there has been considerable interest in producing a document which could not be easily copied by conventional copying devices. This interest strongly manifests itself on occasions when a document is intended to have limited circulation or be one of a kind. Similarly, a document may contain information of a confidential nature, the contents of which are meant to be restricted to a few individuals or only one individual. Some examples of such confidential documents might be secret military data, market research data, new product plans and other limited circulation material.

Along with the advances in printing technology there has come a proliferation of duplicating and copying machines which make it extremely easy to reproduce almost any document. The present invention provides a simple, inexpensive means to prevent or to preclude attempts to make unauthorized copies of documents. Thus, integrity of the contents of such documents is maintained and a long felt need is satisfied.

The visible image on a document can be reproduced because it absorbs light while the background area reflects light. More accurately, an image to be visible must absorb light in the 3900–7000 A. region of the electromagnetic spectrum. The invention provides a method of causing light emanating from a copier to be reflected more or less equally in intensity and energy distribution in the image areas of the document as well as in the background areas of the document. Thus, a copy-proof or non-reproducible document is achieved.

There are several problems inherent in making a copy-proof or non-reproducible document. Among which is the problem of producing a copy-proof document which is readable in ordinary light. That is, sunlight or light from artificial light sources such as incandescent lamps and the like. If the document cannot be easily read under normal lighting conditions it would be unacceptable even though it might be copy-proof. Also there are the problems of achieving a copy-proof document that does not require special handling and that is relatively inexpensive to make. Obviously if elaborate care must be taken with a copy-proof document, the attendant disadvantages and cost may outweigh the benefits sought to be achieved. For similar reasons the copy-proof document must be permanent. Finally, the copy-proof document must not be reproducible on known conventional copying and duplicating devices.

One proposed solution to the problem is to make the master or copy on outsized paper. Thus, it will be extremely difficult to reproduce such masters or copies because they would not conform easily to the exposure station of conventional copying machines. This solution is impractical from a handling and expense point of view since special paper will have to be cut and images enlarged or reduced for placement on the copier. Another proposed solution to the problem is to code the masters or copies so that the copier by means of a code recognition system would determine that the document is not to be reproduced. This solution also suffers from the fact that such a system will be very complex and expensive to make. Moreover, such a system will not provide the flexibility needed to prevent copying by a host of copier devices which are not similarly coded.

Accordingly, it is an object of this invention to provide a document which is rendered non-reproducible when overcoated with a fluorescent film.

Another object of this invention is to provide a non-reproducible document that is readable in ordinary light, that requires no special handling, that is permanent and that is inexpensive to produce.

BRIEF DESCRIPTION OF THE INVENTION

The present invention overcomes the problems presented by providing a document bearing an image which is overcoated with a film of fluorescent material selected to emit light. A document which has been treated in accordance with the teaching of the invention will be legible to the human eye because the fluorescent film material is selected to pass enough ambient light so that a reader may distinguish the writing on the document. However, the illumination from the exposure light source of the copying devices will fluoresce more or less equally in both image and background areas of the treated document. The result is that the proposed copy emerges as a blank from the copying device because no meaningful impression has been made on the photosensitive element of the copier.

The photosensitive elements of the various copying devices usually have different spectral characteristics. That is, the photosensitive elements individually will respond only to a given range of the light spectrum. Some photosensitive elements will not respond to ultra-violet light. Others will not respond to infrared light. Still others will not respond or are insensitive to the light between the ultra-violet and the infrared. For example, a copier having a vitreous selenium photosensitive element is non-responsive or insensitive to light in the region of approximately 5500–7500 A. Yet, a zinc oxide photosensitive element of dyed methylene blue is non-responsive or insensitive to light in the region of roughly 3000–6000 A.

The invention does not rely on the spectral characteristics per se of the photosensitive elements of copier devices in order to obtain a copy proof document. Although the fluorescent film which overcoats a document may emit light in the spectral region to which a given photosensitive element of a copier is responsive, it will do so more or less equally in both the image and background areas. Consequently, the photosensitive element of the copier will see equal fluorescing in all areas of the document. In such event, the copier will be incapable of forming an image which distinguishes between the image and background areas.

These and further objects of the present invention will be more fully understood by reference to the description which follows and the accompanying drawings wherein.

Figure 2:
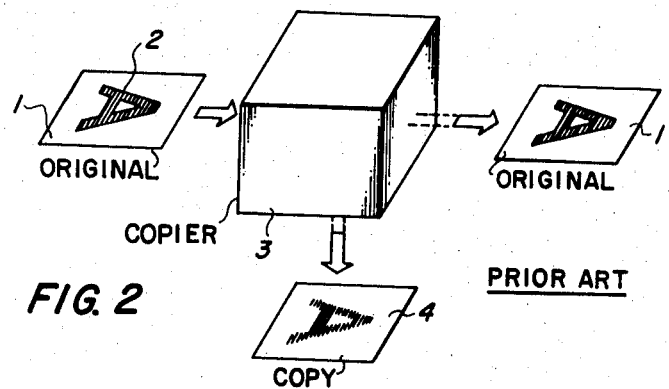
FIG. 2 shows a simplified prior art system of making a copy of an original document.

Referring to FIG. 2, numeral 1 is a document which may be a sheet of conventional paper stock bearing an image 2. When document 1 is applied to copier or duplicator 3 and exposed to a light source therein, the image area 2 of the document will absorb light and the background area of the document will reflect light. Specifically, absorption of light in the image area will form an impression on the photosensitive element of the copier. No impression will form on the photosensitive element where the light is reflected as in the background area. A copy 4 of the original document 1 emerges from the copier following development. Copier or duplicator 3 may be any of the copying or duplicating devices known in the art, e.g. xerographic, photographic, electrophotographic and the like. An example of a typical copying device is described in U.S. Pat. No. 2,357,809 to Carlson.

The inventive concept herein is concerned with the absorption and reflection properties of light. The term absorption as used herein refers to the decrease in intensity of light as it passes through a material. Generally, the light absorption properties of materials or substances may be further broken down into two categories. A substance which reduces the intensity of all wavelengths of light is said to show general absorption. While a substance which reduces the intensity of only certain wavelengths is said to show selective absorption. Where a solid or liquid is subjected to intense light which it is capable of absorbing it may reemit light of a longer wavelength than the incident light. This effect is called fluorescence. For example, a solution of fluorescein in water will absorb the blue portion of white light and will fluoresce a greenish light. The degree of fluorescence may be controlled by selecting fluorescent materials which have the desired properties.

Among fluorescent substances which reemit light in response to electromagnetic radiation are fluorene, rubrene, fluorescein and perylene. These fluorescent substances brilliantly fluoresce or reemit light in solid solutions. In the practice of the invention a mixture of the fluorescent substance and a polycarbonate resin is added to a solvent such as methylene chloride to form a saturated solution. Thus, the requirements for reliable results are that the proportion of the compounds in the solution is simply that they form a saturated solution.

As stated above, the principle of operation of most conventional copying devices is based upon the fact that, in general, image areas on a document will absorb light making an impression on the photosensitive element of the copier whereas the background areas of the document will reflect light leaving the photosensitive element unaffected. Copies may be thereafter produced by developing the images from the photosensitive member onto a suitable support to form a copy. A preferred fluorescent material that is capable of rendering a copy-proof document is rubrene (5,6,11,12 - tetraphenylnapthacene). Rubrene efficiently absorbs light in the 3900–5300 A. region of the electromagnetic spectrum and is transparent in the 5300 - 7000 A. region of the spectrum. Rubrene does not fluoresce appreciably in the solid state but its quantum yield of fluorescence approaches unity in solution. Rubrene is also highly soluble in a number of organic solvents and concentrated solid solutions of rubrene can easily be prepared in polymer matrices. Rubrene prepared in this manner results in solid solutions which are highly fluorescent. The discussion which follows pertains to a fluorescent coating, a photoreceptor and an exposure source all operating in the visible spectrum. However, it will occur to those skilled in the art that the principles disclosed can be employed outside the visible spectrum where desired.

Treating a document with a fluorescent coating in the manner of the invention will have at least one of three effects on the photosensitive or photoreceptor element of a copier device. In a first case, the fluorescent coating applied to a document is selected to absorb all the light emanating from the copier's exposure light source to which the photoreceptor is responsive. In such event no impression is made on the copier's photoreceptor since the light to which it is responsive is totally absorbed by the fluorescent coating. In a second case, the photoreceptor is responsive to light beyond the absorptive ranges of the fluorescent coating. However, the exposure light source falling onto the coated document contains energy in the spectrum which is absorbed by the fluorescent coating. This absorbed energy is then reemitted in the spectrum to which the photoreceptor is responsive, flooding the photoreceptor with intense light so that the photoreceptor cannot distinguish between the image and background areas of the document. Finally, in a third case where the light response of the photoreceptor is partially within and partially without the absorptive range of the fluorescent coating on a document, the light emanating from the copier's exposure source to which the fluorescent coating is responsive will be absorbed and not transmitted to the photoreceptor. The light not absorbed by the fluorescent coating of the document is reflected and exposed to the photoreceptor. This would result in image formation but for the fact that the absorbed energy in the fluorescent coating is reemitted in this region flooding the photoreceptor and preventing it from distinguishing image from background areas.

Figure 1:
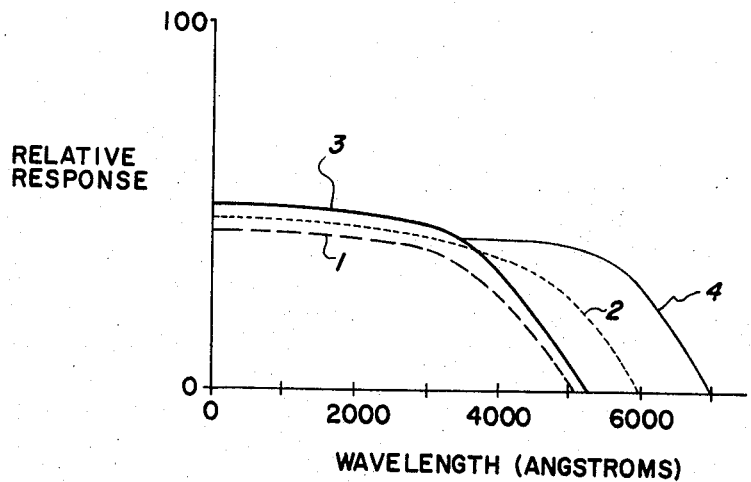
FIG. 1 is a graph showing the response of a fluorescent coating and a photoreceptor to wavelengths in the visible region.

Turning to the representation shown in FIG. 1, these effects are graphically shown. The graph of FIG. 1 is intended merely to illustrate the effect of coating a document with a fluorescent film and the invention is not intended to be limited to the absorptive and reflective ranges therein. The abscissa of the graph measures wavelength in angstrom units and the ordinate of the graph measures the relative response. Broken line curve 1 represents the response of a first photoreceptor and dotted line curve 2 represents the response of a second photoreceptor. Full line curve 3 represents the range of wavelengths which are absorbed by the fluorescent coating. Curve 4 shows the spectrum in which the fluorescent material fluoresces.

When a document is exposed in the region where the first photoreceptor is responsive to the wavelengths of light under the broken curve 1, it will not be affected since the filtering or absorption effect exercised by the fluorescent coating will prevent light in the region from 0–5300 A. from reaching the first photoreceptor. However, the second photoreceptor as depicted by dotted curve 2 has a spectral response which is greater than the absorptive response of the fluorescent coating shown in curve 3. The fluorescent material fluoresces in the region 5300–7000 A., and the light energy which is absorbed below that region is reemitted in the same region. Thus, upon exposure to energy absorbed by the film a document coated with a fluorescent film having a response as shown by curve 3 will reemit light in the image areas as well as the background areas.

Referring again to FIG. 1, it shall be assumed that the copier device contains an exposure light source radiating in the region between 5100–5500 A. and that the fluorescent coating is made of rubene. It shall be further assumed that the spectral response of the copier's photosensitive element is in the region between 3000–6000 A. In such event, the light in the range 5100–5350 A. will be absorbed by the rubrene coating. On the other hand the light outside this region (i.e. 5350–5500 A.) will be transmitted by the rubrene film toward the photoreceptor. In the image areas of the document, this light is absorbed whereas in the background areas of the document it is reflected. However, the light absorbed by the rubrene coating (5100–5350 A.) will be reemitted in the region (5300–7000 A.) thus, swamping the image contrast developed by the transmitted light and intensifying the light impinging on the photoreceptor, preventing it from distinguishing between the background and image areas.

In order to provide a fluorescent film in preparation of a copy-proof document, a mixture of rubrene and a polycarbonate resin is dissolved in methylene chloride in suitable proportions to form a saturated solution. The resulting orange solution is then painted onto the document. After evaporation of the solvent a transparent orange polymer film which is highly fluorescent is left deposited on the document. The image on the document after this treatment is easily read in normal light since the fluorescent film is transparent to visible light in the 5300–7000 A. region. When the treated document is sought to be reproduced on a conventional copier the overcoated area of this document under the influence of the light from the copier exposure source reemits the light in the image areas as well as the background areas. Thus, an image of the document is not impressed on the photosensitive element of the copier preventing a copy of the document from being made.

Although in one form of the invention the document is treated with fluorescent material by painting a film of the solution thereon, the film can also be applied by aerosol spraying or like means. In addition to rubrene, saturated solid solutions may be prepared using other preferred fluorescent materials such as fluorene (alpha-diphenylenemethane), perylene and fluorescein (resorcinalphthalein).

Figure 3:
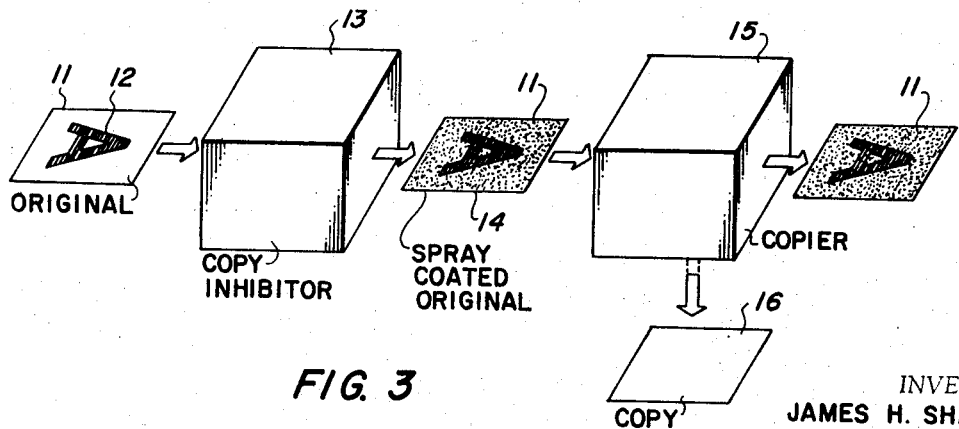
FIG. 3 depicts a simplified copier or duplicator system wherein a document according to the invention is rendered copy-proof.

Referring now to FIG. 3 there is depicted a simplified copying device wherein a document treated in the manner of the invention is sought to be reproduced. Document 11 bearing image 12 undergoes an overcoating process in copy inhibitor 13. That is, document 11 is either spray coated or painted with a solution containing a fluorescent material such as rubrene or other suitable fluorescent material. When the solvent has evaporated document 11 emerges from the copy inhibitor 13 with an overcoating of fluorescent film 14 as shown with image 12 visible in ordinary light. Upon being applied to the exposure station of copier 15 the light from exposure sources in the copier is reemitted more or less equally in the image areas as well as in the background areas of document 11 so that no distinguishable image impression is made on the copier's photosensitive element and the copy 16 which emerges from the copier 15 is blank.

Where only selected portions of a document are to be copy-proof the document may be treated with the fluorescent material only in such portions. Thus, the prices of stock items of an order form could be rendered copy-proof while the other information thereon would not be affected. Several different fluorescent materials may be utilized concurrently to overcoat a document. For example, different fluorescent materials may overcoat the document in vertical or horizontal strips or in a checkerboard fashion. In such a case, the chosen fluorescent materials would enhance the fluorescing capability over a larger spectrum. In lieu of a fluorescent film an ink of fluorescent material may be used to form images on a sheet. A document prepared in this manner would likewise be copy-proof. In another embodiment of the invention images are impressed on colored stock so chosen to be non-responsive to the photosensitive element and overcoated with the fluorescent film. This embodiment also prevents image formation on the photosensitive element.

From the foregoing, a method of overcoating a document with a light reflective fluorescent film for rendering the document copy-proof has been disclosed.

What is claimed is:

1. A method for preventing the reproduction of a document by a light-responsive copying device comprising
   (a) providing a document bearing an image with a film of a fluorescent material which substantially absorbs electromagnetic radiation in the visible spectrum, said film being at least partially transparent to visible light;
   (b) providing a light-responsive copying device which has an exposure device including a source of electromagnetic radiation which includes visible light; and
   (c) exposing said document to the source of electromagnetic radiation of said copying device whereby said fluorescent film prevents the document from being reproduced by the copying device.

2. The method as defined in claim 1 wherein said fluorescent film comprises a material selected from the group consisting of rubrene, fluorene, perylene and fluorescein.

3. The method as defined in claim 1 wherein said source of electromagnetic radiation of said copying device is a visible light source and said fluorescent film absorbs substantially all of the electromagnetic radiation emitted by said source.

4. The method as defined in claim 3 wherein said copying device includes a photoconductive member which is responsive to electromagnetic radiation in the visible region.

5. The method as defined in claim 1 wherein said copying device includes a photoconductive member which is responsive to electromagnetic radiation in a region outside of the absorptive range of said fluorescent film and said fluorescent film reemits electromagnetic radiation within the region to which said photoconductive member is responsive.

6. The method as defined in claim 1 wherein said copying device includes a photoconductive member which is responsive to electromagnetic radiation in a region which is partially within and partially outside of the absorptive range of said fluorescent film and said fluorescent film reemits electromagnetic radiation within the region to which said photoconductive member is responsive.

7. The method as defined in claim 6 wherein said photoconductive member is responsive to electromagnetic radiation within the visible region.

8. The method as defined in claim 7 wherein said fluorescent film comprises a material selected from the group consisting of rubrene, fluorene, perylene and fluorescein.

9. A method for producing a document which is copy-proof in a light responsive copying device comprising overcoating a document bearing an image with a film of a fluorescent material which substantially absorbs electromagnetic radiation in the visible spectrum, said film being at least partially transparent to visible light.

10. The method as defined in claim 9 wherein said document is overcoated in only a selected area of said document.

11. The method as defined in claim 9 wherein said document is overcoated with different fluorescent substances in selected areas of said document.

12. A copy-proof document comprising a support means bearing an image thereon and overcoated with a film of a fluorescent material which substantially absorbs electromagnetic radiation in the visible spectrum, said film being at least partially transparent to visible light.

13. The copy-proof document as defined in claim 12 wherein said support means comprises a colored sheet.

14. The copy-proof document as defined in claim 12 wherein said fluorescent film comprises a material selected from the group consisting of rubrene, fluorene, perylene and fluorescein.

15. The copy-proof document as defined in claim 12 wherein said fluorescent film is present in only selected areas of said document.

16. The copy-proof document as defined in claim 12 wherein said overcoating comprises a plurality of fluorescent films in selected areas of said document.

References Cited

UNITED STATES PATENTS

| | | | |
|---|---|---|---|
| 17,473 | 1/1857 | Seropyan | 117—1 |
| 2,710,285 | 6/1955 | Trusler | 117—33.5 T X |
| 2,763,785 | 9/1956 | Switzer | 106—20 X |
| 3,218,183 | 11/1965 | Fritzsching et al. | 117—33.5 T X |
| 3,561,990 | 2/1971 | Dressler | 117—33.5 T |

RALPH S. KENDALL, Primary Examiner

U.S. Cl. X.R.

117—33.5 T; 283—6